(12) United States Patent
Bilger et al.

(10) Patent No.: US 10,924,928 B1
(45) Date of Patent: *Feb. 16, 2021

(54) SYSTEM AND METHOD FOR PROVIDING AUTHENTICATED IDENTITY OF MOBILE PHONES

(71) Applicant: Verizon Patent and Licensing Inc., Basking Ridge, NJ (US)

(72) Inventors: Brent R. Bilger, Los Altos Hills, CA (US); William F. Copeland, Garland, TX (US); Shailesh K. Venugopal, Gilroy, CA (US); Junaid Islam, San Jose, CA (US); Michel J. Basmaji, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/019,559

(22) Filed: Sep. 14, 2020

Related U.S. Application Data

(63) Continuation of application No. 16/574,208, filed on Sep. 18, 2019, now Pat. No. 10,805,799.

(51) Int. Cl.
| | |
|---|---|
| *H04W 12/06* | (2009.01) |
| *H04L 9/32* | (2006.01) |
| *H04W 12/00* | (2021.01) |
| *H04L 29/06* | (2006.01) |
| *H04W 8/18* | (2009.01) |
| *H04W 8/20* | (2009.01) |
| *H04W 12/04* | (2021.01) |

(52) U.S. Cl.
CPC ........... *H04W 12/06* (2013.01); *H04L 9/3228* (2013.01); *H04L 9/3234* (2013.01); *H04L 63/0853* (2013.01); *H04W 8/183* (2013.01); *H04W 8/205* (2013.01); *H04W 12/0023* (2019.01); *H04W 12/04* (2013.01)

(58) Field of Classification Search
CPC ..... H04W 12/06; H04W 8/205; H04W 8/183; H04W 12/0023; H04W 12/04; H04L 9/3228; H04L 9/3234; H04L 63/0853
See application file for complete search history.

(56) References Cited

U.S. PATENT DOCUMENTS

| | | | |
|---|---|---|---|
| 9,247,429 B2 * | 1/2016 | Babbage | H04L 9/3236 |
| 9,332,008 B2 * | 5/2016 | Burch | H04L 63/0846 |

(Continued)

*Primary Examiner* — Julio R Perez

(57) ABSTRACT

Systems and methods validate that subscriber identity module (SIM) number of an end device connected to a network is the same number that was activated for that device. A network device in a network obtains a SIM number and a universal identifier (UID) for the end device during an activation procedure. The network device generates a unique SIM authentication code based on the SIM number, the UID, and a master key. The network device sends the unique SIM authentication code to the end device as part of the activation procedure. After activation, the network device receives, from the end device, an authentication message that includes a first one-time password (OTP), the UID, a time value, the SIM number, and the SIM authentication code. The network device generates a second OTP based on the UID, the time value, the SIM number, and the master key and validates a pairing of the end device and the SIM number when the two OTPs match.

20 Claims, 10 Drawing Sheets

(56) References Cited

U.S. PATENT DOCUMENTS

| | | | |
|---|---|---|---|
| 9,699,655 B1* | 7/2017 | Silis | H04L 9/006 |
| 2004/0034772 A1 | 2/2004 | Alao | |
| 2006/0206710 A1* | 9/2006 | Gehrmann | H04L 63/061 |
| | | | 713/168 |
| 2010/0029247 A1* | 2/2010 | De Atley | H04W 8/265 |
| | | | 455/411 |
| 2010/0099380 A1* | 4/2010 | Chen | H04L 63/0838 |
| | | | 455/411 |
| 2012/0260090 A1* | 10/2012 | Hauck | H04L 63/0853 |
| | | | 713/168 |
| 2015/0143125 A1* | 5/2015 | Nix | H04L 9/0841 |
| | | | 713/171 |
| 2016/0020804 A1* | 1/2016 | Lee | H04B 1/3816 |
| | | | 455/558 |

* cited by examiner

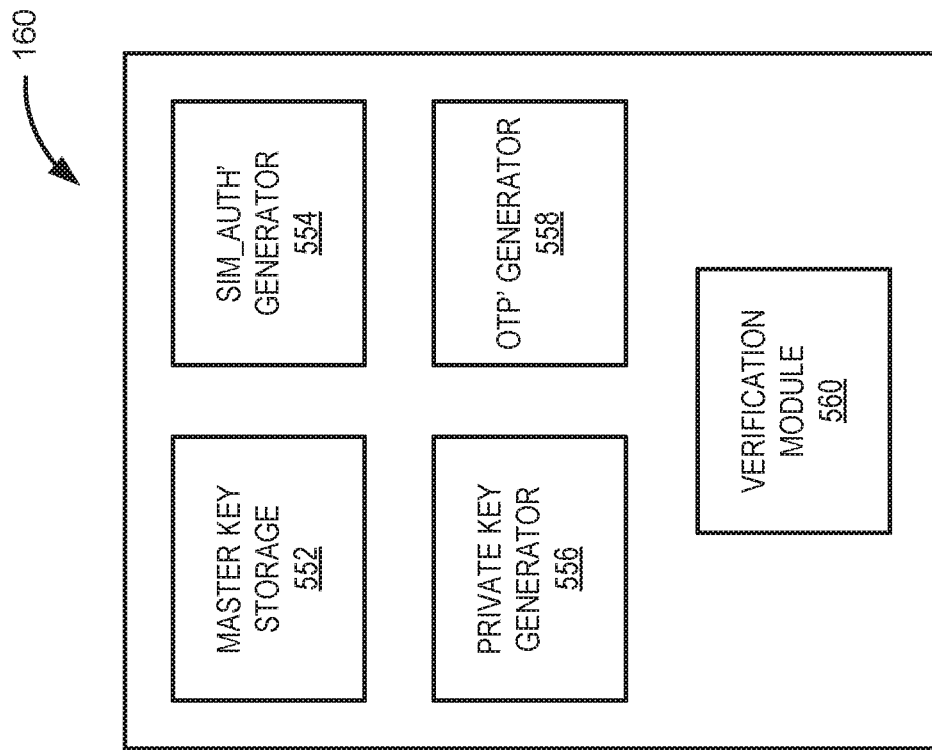
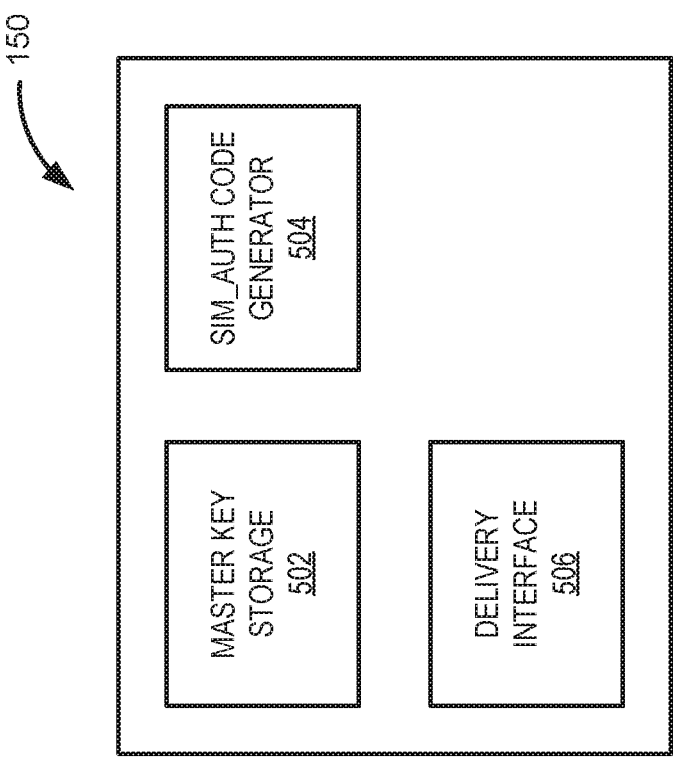
FIG. 5B
FIG. 5A

SYSTEM AND METHOD FOR PROVIDING AUTHENTICATED IDENTITY OF MOBILE PHONES

BACKGROUND INFORMATION

This application is a continuation of U.S. patent application Ser. No. 16/574,208, entitled "System and Method for Providing Authenticated Identity of Mobile Phones," filed on Sep. 18, 2019, the contents of which are hereby incorporated by reference.

BACKGROUND INFORMATION

A Subscriber Identity Module (SIM) card is used on various mobile devices. The SIM card may be implemented as a separate physical card, such as a Universal Integrated Circuit Card (UICC) that is inserted into the mobile device, or as an embedded UICC that is integrated with the mobile device.

BRIEF DESCRIPTION OF THE DRAWINGS

FIG. 5A is a block diagram illustrating logical components of a mobile network operator (MNO) activation platform of FIG. 1;

FIG. 5B is a block diagram illustrating logical components of a MNO authentication platform of FIG. 1;

DETAILED DESCRIPTION OF PREFERRED EMBODIMENTS

The following detailed description refers to the accompanying drawings. The same reference numbers in different drawings identify the same or similar elements.

The identity of a mobile device (also referred to as an end device or user equipment (UE)) is based on the SIM. However, SIMs can be swapped and forged. If a SIM/eSIM is swapped or forged, communications using a user's mobile number may be received at or generated from a different device than the mobile device for which the SIM card was originally provisioned. Presently, there is no way to independently verify that the SIM for a given end device has not been changed.

Systems and methods described herein provide a cryptographic way of validating that the SIM of an end device connected to the network is the same SIM that was activated for that end device. The systems and methods can be used to determine if the SIM has been swapped with another SIM or forged. The systems and methods may be executed over an untrusted network where an adversarial man-in-the-middle might try to attack.

By adding cryptographic metadata and a small amount of software to an end device during the manufacturing and SIM activation processes, a mobile network operator (MNO) can verify that the end device has the same SIM as when it was last activated every time that end device connects to the network. Thus, systems and methods described herein can be used to verify that the SIM on the end device belongs on the end device and was not forged or swapped.

According to implementations described herein, the cryptographic solutions can scale to a very large number of end devices. In addition, the verifications can be performed quickly without the use of database lookups. Furthermore, the verification process is computationally efficient and requires minimal hardware to provide the processing power for implementation.

Figure 1:
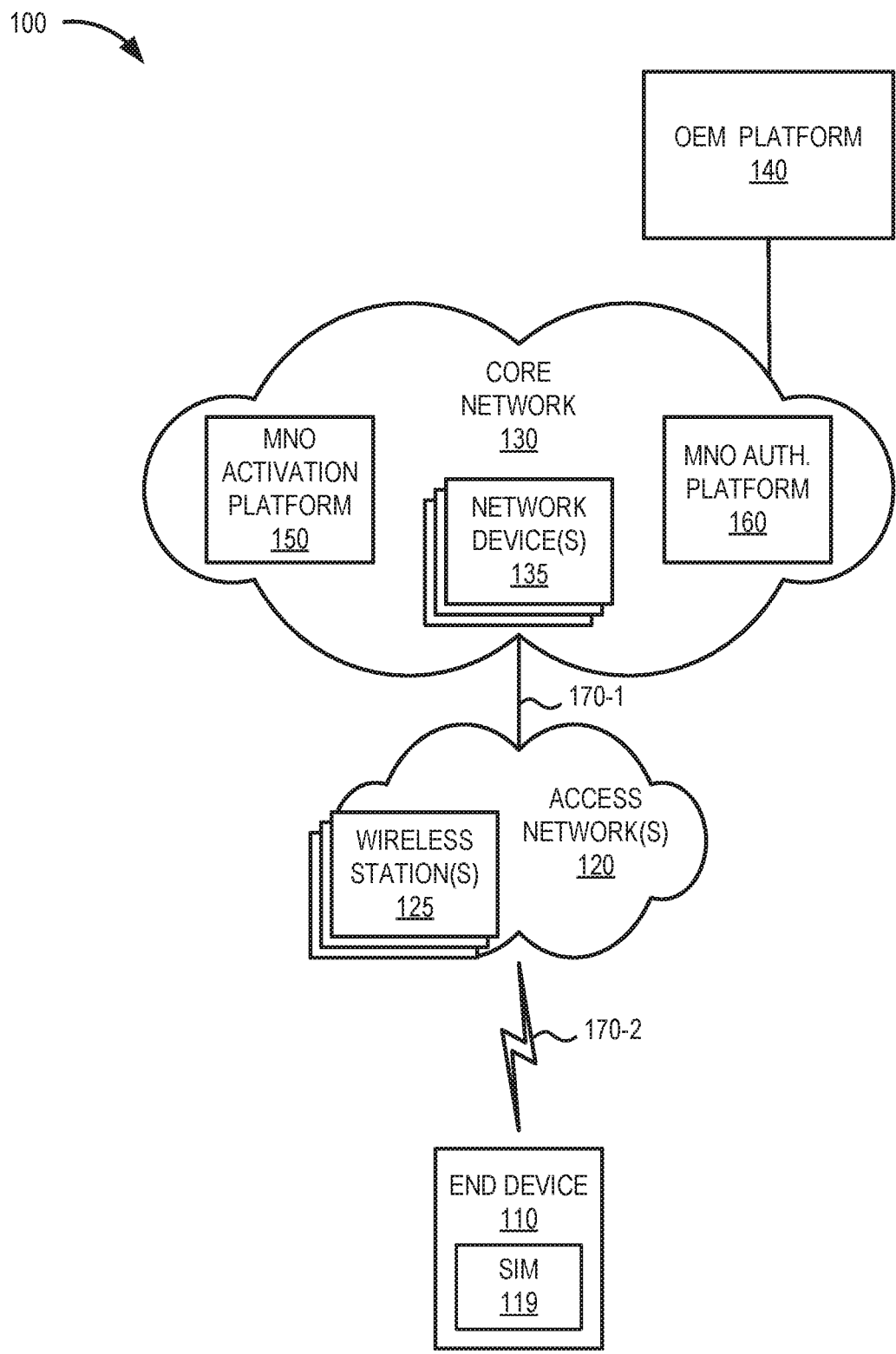
FIG. 1 is a diagram illustrating a network environment according to an implementation described herein.

FIG. 1 is a diagram of an exemplary environment 100 in which the systems and/or methods, described herein, may be implemented. As shown in FIG. 1, environment 100 may include an end device 110, one or more access networks 120, a backend network 130, an original equipment manufacturer (OEM) platform 140, a MNO provisioning platform 150, and a MNO authentication platform 160. Access network 120 and core network 130 may be collectively referred to as a wireless network.

End device 110 may include any device with long-range (e.g., cellular or mobile wireless network) wireless communication functionality. For example, end device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player, a WiFi access point, a smart television, etc.; a portable gaming system; a global positioning system (GPS) device; a home appliance device; a home monitoring device; and/or any other type of computer device with wireless communication capabilities and a user interface. In some implementations, end device 110 may communicate using machine-to-machine (M2M) communication, such as machine-type communication (MTC), and/or another type of M2M communication.

According to implementations described herein, end device 110 may include a SIM 119. SIM 119 may be implemented, for example, in a secure element (SE), a universal integrated circuit card (UICC), an embedded UICC (eUICC), or a component with another form factor. SIM 119 may be embedded or fixed on (e.g., relative to other hardware of end device 110) or may be removable from end device 110. SIM 119 may include various components, such as a processor, a memory, and software components. According to an exemplary embodiment, SIM 119 includes a memory that stores a file or an applet (e.g., a container) that includes one or more subscription profiles.

Access network 120 may provide access to core network 130 for wireless devices, such as end device 110. Access network 120 may enable end device 110 to connect to core network 130 for mobile telephone service, Short Message Service (SMS) Multimedia Message Service (MMS), Internet access, cloud computing, and/or other types of data services. In one implementation, different access networks may be associated with different MNOs. In some implementations, access network 120 may include, for example, a Fifth Generation (5G) New Radio (NR) access network or an evolved Universal Mobile Telecommunications System (UMTS) Terrestrial Radio Access Networks (EUTRAN). In other implementations, access network 120 may include a Code Division Multiple Access (CDMA) access network based on, for example, a CDMA 2000 standard.

Access network 120 may include wireless stations 125. Each wireless station 125 may service a set of end devices 110. For example, a wireless station 125 may service some end devices 110 when the end devices 110 are located within the geographic area serviced by the wireless station 125.

Core network 130 may manage communication sessions for end devices 110. Core network 130 may provide mobility management, session management, authentication, and packet transport, to support end device 110 and wireless station 125 wireless communications using, for example, a dual connectivity, multi-RAT configuration. Core network 130 may further provide access to data networks 140. Core network 130 may be compatible with known wireless standards which may include, for example, 3GPP 5G, LTE, LTE Advanced, Global System for Mobile Communications (GSM), Universal Mobile Telecommunications System (UMTS), IS-2000, etc. For example, core network 130 may establish an Internet Protocol (IP) connection between end device 110 and a particular data network 140.

Core network 130 may include various types of network devices 135, which may implement different network functions described further herein. Network devices 135 may include for example an Access and Mobility Management Function (AMF), a User Plane Function (UPF), a Session Management Function (SMF), Unified Data Management (UDM) 352, a Policy Control Function (PCF). According to an implementation, functions described herein may be performed by one or multiple network devices 135. In one implementation, MNO activation platform 150 and MNO authentication platform 160 may be implemented in one or more network devices 135.

OEM platform 140 includes one or more network devices, or other types of computation or communication devices, to facilitate master key generation and private key generation for end devices 110 during, for example, a manufacturing process. According to an implementation, OEM platform 140 may include a Quantum Random Number Generator (QRNG) to generate a master key and private keys.

MNO activation platform 150 (or activation platform 150) may include one or more network devices, or other types of computation or communication devices, to facilitate personalization and/or remote provisioning of end device 110. Activation platform 150 may be included, for example, in one or more of network devices 135. Activation platform 150 may also include one or more engineering, operation, and inventory databases and systems that maintain and provide information relating to activating and provisioning service orders in network environment 100. Activation platform 150 may include tools for enabling entry and tracking of customer service orders and may actively transmit information regarding the orders to other systems in network environment 100, such as a billing system (not shown). In some implementations, activation platform 140 may include inventory information associated with all devices and equipment within environment 100, including end devices 110. According to implementations described herein, activation platform 150 may securely store a copy of the master key (e.g., generated by OEM platform 140). As described further herein, activation platform 150 may generate a unique SIM authentication code based on the master key and provide the SIM authentication code to each end device 110 during a network activation process.

MNO authentication platform 160 (or authentication platform 160) may include one or more network devices, or other types of computation or communication devices, to validate a SIM/end device pair that connects to the wireless network. Authentication platform 160 may be included, for example, in one or more of network devices 135. In another implementation, authentication platform 160 may be incorporated within another network function, such as an AMF or PCF. As described further herein, after end device 110 is activated on the wireless network, authentication platform 160 may receive an authentication message from the end device 110. The authentication message includes, among other information, a one-time password (OTP). Authentication platform 160 may recreate the OTP using the master key and may validate the SIM/end device pair when the two OTPs match.

As further illustrated, network environment 100 includes communicative links 170 between the network elements and networks (although only two are referenced in FIG. 1 as links 170-1 and, 170-2). A network element may transmit and receive data via a link 170. Network environment 100 may be implemented to include wireless and/or wired (e.g., electrical, optical, etc.) links 170. A communicative connection between network elements may be direct or indirect. For example, an indirect communicative connection may involve an intermediary device or network element, and/or an intermediary network not illustrated in FIG. 1. Additionally, the number, the type (e.g., wired, wireless, etc.), and the arrangement of links 170 illustrated in environment 100 are exemplary.

Although FIG. 1 shows exemplary components of environment 100, in other implementations, environment 100 may include fewer components, different components, differently-arranged components, or additional functional components than depicted in FIG. 1. Additionally or alternatively, one or more components of environment 100 may perform functions described as being performed by one or more other components of environment 100.

Figure 2:
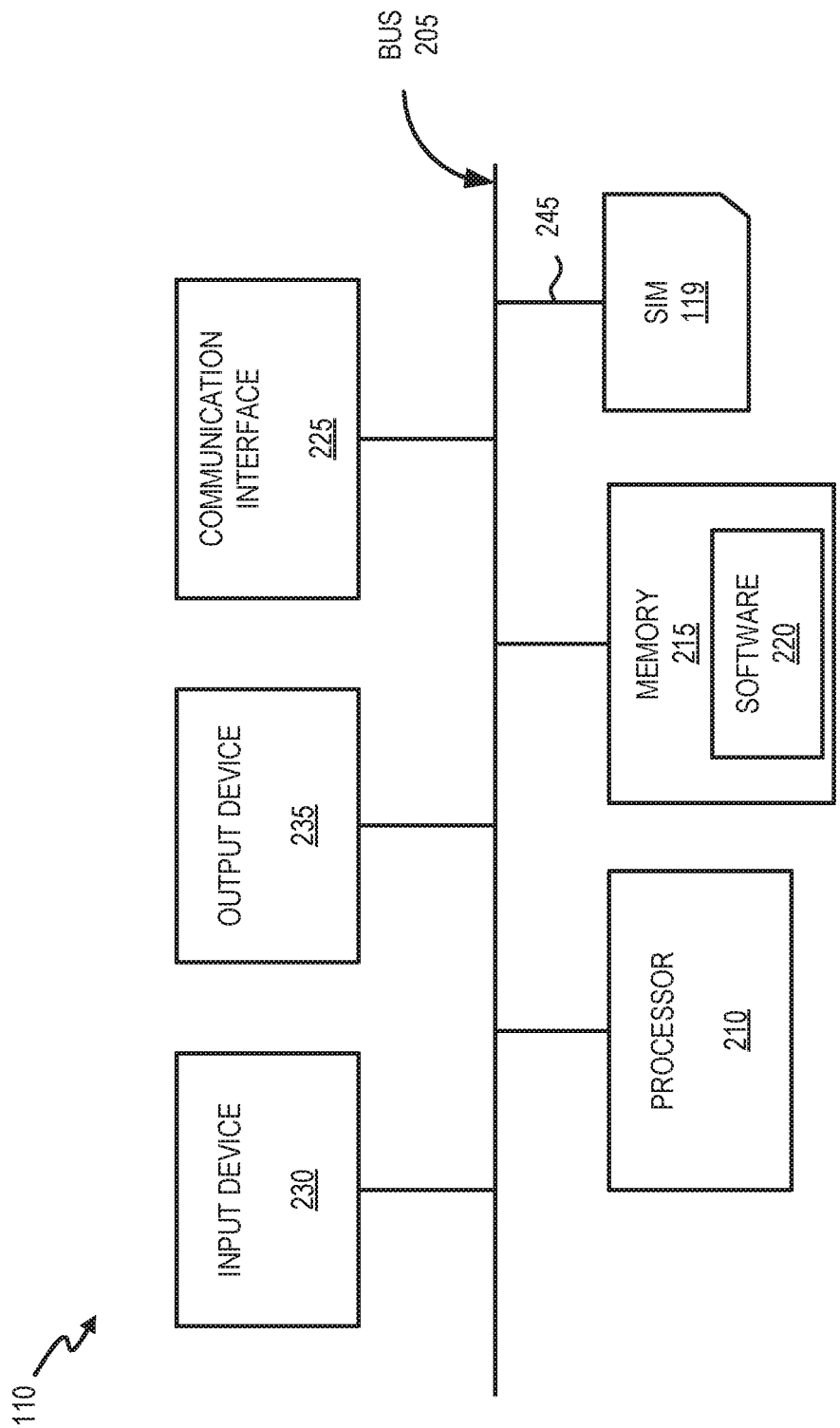
FIG. 2 is a diagram illustrating exemplary logical components of an end device that may be included in a device of FIG. 1.

FIG. 2 is a diagram illustrating exemplary components of end device 110. As illustrated in FIG. 2, according to an exemplary embodiment, end device 110 includes a bus 205, a processor 210, memory/storage 215 that stores software 220, a communication interface 225, an input device 230, an output device 235, and a secure element interface 245. As further illustrated, end device 110 includes SIM 119. According to other embodiments, end device 110 may include fewer components, additional components, different components, and/or a different arrangement of components than those illustrated in FIG. 2 and described herein.

Bus 205 includes one or multiple paths that permit communication among the components of end device 110. For example, bus 205 may include various types of buses, such as a system bus, an address bus, a data bus, a control bus, etc. Bus 205 may also include other types of components, such as bus drivers, bus arbiters, bus interfaces, clocks, etc.

Processor 210 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 210 may be implemented as hardware (e.g., a microprocessor, etc.), a combination of hardware and software (e.g., a SoC, an ASIC, etc.), may include one or multiple memories (e.g., cache, etc.), etc. Processor 210 may control the overall operation or a portion of operation(s) performed by end device 110.

Memory/storage 215 includes one or multiple memories and/or one or multiple other types of storage mediums. For example, memory/storage 215 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 215 may store data, software, and/or instructions related to the operation of end device 110.

Software 220 includes an application or a program that provides a function and/or a process. Software 220 is also intended to include firmware, middleware, microcode, hardware description language (HDL), and/or other form of instruction (e.g., libraries, script, module, etc.). Software 220 includes an operating system (OS). For example, depending on the implementation of end device 110, the operating system may correspond to iOS, Android, Windows Phone, Symbian, or another type of operating system (e.g., proprietary, BlackBerry OS, Windows, Linux, Open AT, eCos, etc.). Software 220 may include various end user applications and/or programs, such as a telephone application, a multi-media application, a video call application, and so forth, as previously described. Additionally, according to an exemplary embodiment, software 220 includes instructions to generate and send authentication messages as part of a network connection process, as described further herein.

Communication interface 225 permits end device 110 to communicate with other devices, networks, systems, and/or the like. Communication interface 225 includes a wireless interface. For example, the wireless interface may support one or multiple short-range wireless access technologies (e.g., Wi-Fi™, Bluetooth™, Zigbee™, etc.) and/or one or multiple long-range wireless access technologies (e.g., 5G NR, LTE, CDMA, GSM, etc.). Communication interface 225 includes a transmitter and a receiver, or a transceiver.

Input device 230 permits an input into end device 110. For example, input device 230 may include a touch keyboard, a display, a button, a switch, an input port, speech recognition logic, a microphone, a camera, and/or some other type of visual, auditory, tactile, etc., input component. Output device 235 permits an output from end device 110. For example, output device 235 may include a speaker, a display, a light, an output port, and/or some other type of visual, auditory, tactile, etc., output component. According to some embodiments, input device 230 and/or output device 235 may each be a device that is attachable to and removable from end device 110.

Secure element interface 245 includes a terminal interface that provides operability and communication between end device 110 and SIM 119. Depending on the implementation of SIM 119 (e.g., eUICC, UICC, etc.), secure element interface 245 may comport with a particular terminal interface standard (e.g., 3GPP, GSMA, etc.), a proprietary terminal interface, and so forth.

End device 110 may perform a process and/or a function, as described herein, in response to processor 210 executing software 220 stored by memory/storage 215. By way of example, instructions may be read into memory/storage 215 from another memory/storage 215 (not shown) or read from another device (not shown) via communication interface 225. The instructions stored by memory/storage 215 cause processor 210 to perform a process described herein. Additionally, or alternatively, end device 110 may perform a process and/or a function based on various combinations of communication interface 225, SIM 119, processor 210 executing software 220, and so forth.

Figure 3:
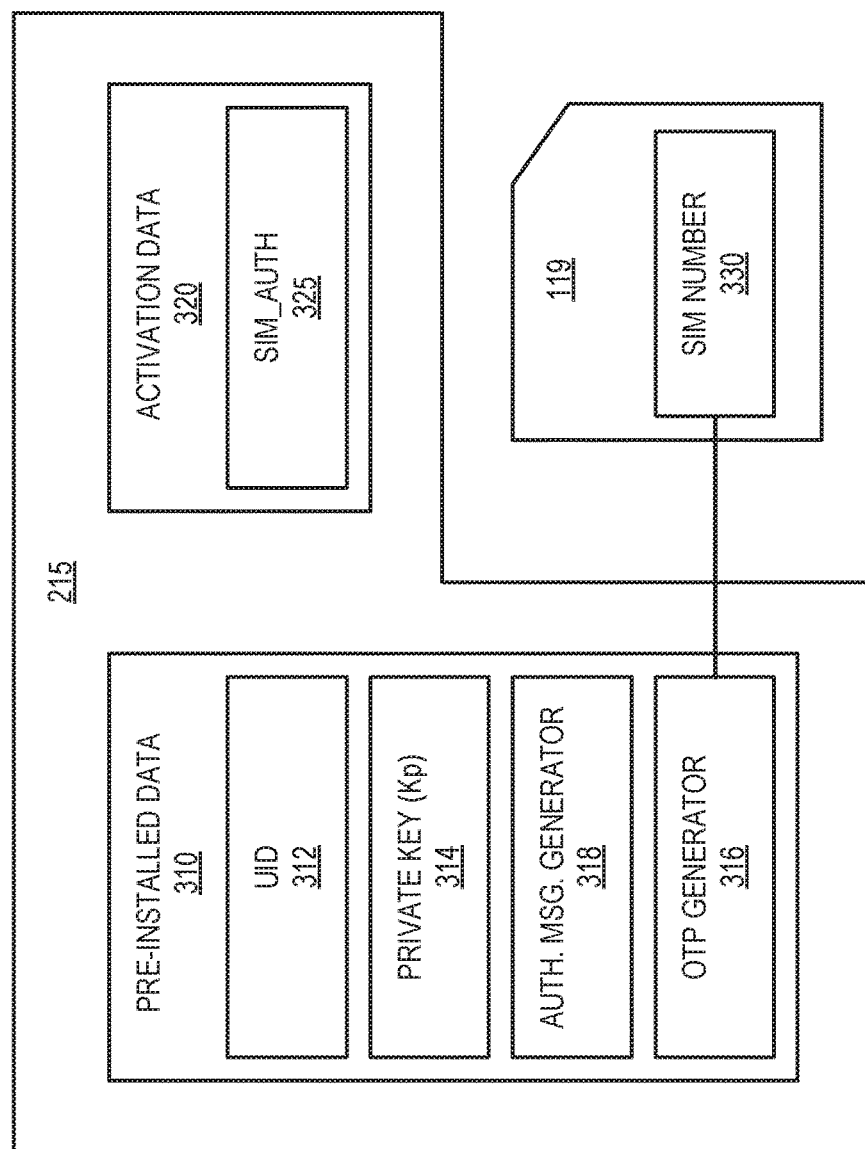
FIG. 3 is a diagram illustrating exemplary memory components of the end device of FIG. 1.

FIG. 3 is a diagram illustrating exemplary stored information in memory 215 and SIM 119 of end device 110. As illustrated, end device 110 may include pre-installed data 310 and activation data 320 stored, for example, in memory 215 and a SIM number 330 stored on SIM 119.

Pre-installed data 310 may include information installed during manufacturing of end device 110 that is later used to provide authenticated identity of end device 110. As shown in FIG. 3, pre-installed data 310 may include a universal identity (UID) 312 for end device 110, a private key (Kp) 314, and a one-time password (OTP) generator 316.

UID 312 may include a unique identifier for end device 110. According to an implementation, UID 312 may be a random number (e.g., a 256-bit or greater number). Kp 314 may include a private key for end device 110. According to an implementation, Kp 314 may be derived (e.g., by OEM platform 140) from UID 312 and a master key using, for example, a Message Authentication Code (MAC) algorithm, such as HMAC (keyed-Hash Message Authentication Code) or GMAC (Galois Message Authentication Code). Kp 314 may be loaded into a secure location in memory 215 during the manufacturing process. Thus, Kp 314 is stored in a memory location where it cannot be accessed/extracted by unauthorized parties. UID 312 may be stored with Kp 314 or in another memory location.

OTP generator 316 may include instructions to create an OTP when end device 110 connects to core network 130. According to implementations described herein, OTP generator 316 may implement an OTP algorithm that uses UID 312, Kp 314, a time, and a SIM_Auth 325 (described below) to create a one-time password each time end device 110 connects to core network 130. The OTP algorithm may include a MAC (e.g., HMAC), such that:

$$OTP=MAC[Kp,UID\|Time\|SIM\_Auth],$$

where Time is the present time indicated on end device 110 (e.g., in milliseconds).

Authentication message generator 318 may generate an authentication message that is provided to core network 130 (e.g., authentication platform 160) as part of every network connection by end device 110. According to an implementation, the authentication message may include the OTP (e.g., from OTP generator 316), the UID (e.g., UID 312), a time value corresponding to the current time, the SIM number (e.g., SIM number 330 described below), and the SIM_Auth (e.g., SIM_Auth 325 described below) for end device 110

Activation data 320 may include information installed during an activation or network provisioning process for end device 110. Activation data 320 may be used to provide authenticated identity of end device 110 for each subsequent network connection. As shown in FIG. 3, activation data 320 may include a SIM authentication code (SIM_Auth) 325. SIM_Auth 325 may be an authentication code, which is specific to end device 110, that is created by activation platform 150 or a network device 135 in core network 130. According to an implementation, SIM_Auth 325 may be stored in a secure memory location (e.g., with Kp 314). In another implementation, SIM_Auth 325 may be stored in a separate secure or unsecure memory location of end device 110.

SIM 119 may store, among other information, SIM number 330. SIM number 330 may include, for example, a universally unique number assigned to SIM 119 by the SIM manufacturer. In another implementation, SIM number 330 may include a universally unique number assigned to SIM 119 via an OTA provisioning process.

Although FIG. 3 provides exemplary memory components on end device 110, in other implementations, end device 110 may include additional, fewer, or differently-arranged memory components.

Figure 4:
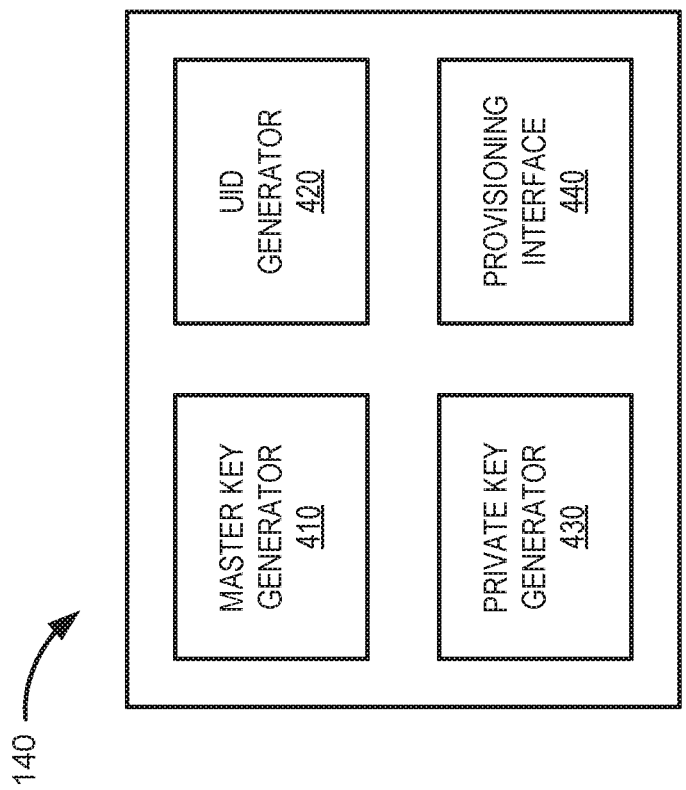
FIG. 4 is a block diagram illustrating logical components of an original equipment manufacturer (OEM) platform of FIG. 1.

FIG. 4 is a diagram illustrating exemplary components of OEM platform 140. OEM platform 140 may include a master key generator 410, a UID generator 420, a private key generator 430, and a provisioning interface 430.

Master key generator 410 may generate a master key that may be associated with a MNO. For example, master key generator 410 may generate a large random number (e.g., 512-bits, 1024-bits, etc.) that becomes the master key, Km, for a particular MNO. Alternatively, master key generator 410 may provide a different master key (e.g., $Km_1$, $Km_2$, etc.) for each end device model for the MNO. Use of different master keys for each end device model could, for example, limit the damage from a compromised master key. In one implementation, master key generator 410 may implement a QRNG. According to an implementation, master key generator 410 may use an HSM to encrypt and store the master key. Master key generator 410 may provide Km to a secure network device 135 in core network 130. According to another implementation, master key generator 410 may create a secure memory device for physical transport.

UID generator 420 may generate a random number as a UID for each end device 110 manufactured by the OEM. According to an implementation, UID generator 420 may generate a 256-bit or greater random number that becomes the UID. In one implementation, UID generator 420 may implement a QRNG to create each UID.

Private key generator 430 may create a separate private key, Kp, for each end device 110 using the master key and the corresponding UID for each end device 110. For example, private key generator 420 may use a MAC (e.g., HMAC) algorithm, such that:

Kp=MAC[Km,UID].

Kp will appear to be a completely random number. However, Kp can be regenerated if the UID of a particular end device 110 and the master key are known.

Provisioning interface 440 may upload the UID and Kp into a secure memory location of a corresponding end device 110 as part of the manufacturing process. Additionally, provisioning interface 440 may upload the algorithm for OTP generator 316 described above.

Although FIG. 4 provides exemplary logical components of OEM platform 140, in other implementations, OEM platform 140 may include more, fewer, or different logical components. For example, in some implementations, master key generator 410 may be included in a separate network or location, such as core network 130.

FIG. 5A is a diagram illustrating exemplary components of MNO activation platform 150. MNO activation platform 150 may include master key storage 502, a SIM authentication (SIM_Auth) code generator 504, and a delivery interface 506.

Master key storage 502 may include a secure memory location, such as an HSM, where the Km may be stored. According to an implementation where a different master key is assigned for each model of end device, master key storage 502 may include an index of models and different master keys. SIM authentication code generator 504 creates a device-specific SIM authentication code (e.g., SIM_Auth 325) based on the master key (e.g., Km), the end device's UID, and the SIM number (e.g., SIM number 330) for the SIM associated with end device 110. For example, SIM authentication code generator 504 may use a MAC (e.g., HMAC) algorithm, such that:

SIM_Auth=MAC[Km,UID‖SIM #].

According to an implementation, SIM authentication code generator 504 may be included within an HSM of MNO activation platform 150, ensuring that Km is not exposed outside a secure environment.

Delivery interface 506 may detect the SIM number of an incoming activation request or obtain the SIM number from other network connection information. Once the SIM_Auth is generated, delivery interface 506 may send the SIM_Auth to the respective end device 110 as part of the SIM activation process.

FIG. 5B is a diagram illustrating exemplary components of MNO authentication platform 160. MNO authentication platform 160 may include master key storage 552, SIM_Auth' generator 554, Kp' generator 556, OTP' generator 558, and verification module 560.

Similar to master key storage 502, master key storage 552 may store a local copy of Km in a secure memory location, such as an HSM. SIM_Auth' generator 554 may separately generate a copy of a SIM_Auth, referred to as SIM_Auth', based on the UID and SIM number of end device 110 along with the master key. The SIM number may be a SIM number as provided by end device 110 or a SIM number obtained from wireless network connection data. Thus, the recreated SIM authentication code may be defined as:

SIM_Auth'=MAC[Km,UID‖SIM #].

Kp' generator 556 may separately generate a local copy of the end device's 110 private key using the master key and the UID provided by end device 110. The recreated private key, Kp', may be defined as:

Kp'=MAC[Km,UID].

OTP' generator 558 may separately generate a local copy of the end device's 110 one-time password using information provided by end device 110 and codes derived using the stored master key. OTP' generator 558 may attempt to recreate the same one-time password, OTP', that end device 110 previously created using Kp' (e.g., as generated by Kp' generator 556), the UID, a time value (e.g., provided by end device 110), and SIM_Auth' (e.g., as generated by SIM_Auth' generator 554). Thus, the recreated one-time password may be defined as:

OTP'=MAC[Kp',UID‖Time‖SIM_Auth'].

Verification module 560 may determine if a SIM/end device pair is valid based on a comparison of the OTP from end device 110 and the OTP' from OTP' generator 558. Verification module 560 may also check that the OTP was received within a configurable time window. For example, if OTP and OTP' match, verification module 560 may use the time value from the end device's 110 authentication message to ensure that the OTP was received within a reasonable time (e.g., a time window of a few seconds or fractions of seconds) to prevent spoofing.

According to an implementation, each of master key storage 552, SIM_Auth' generator 554, and Kp' generator 556 may be included within an HSM of MNO authentication platform 160 to ensure that Km is not exposed outside a secure environment. In other implementations, OTP' generator 558 and/or verification module 560 may also be included within the HSM.

Although FIGS. 5A and 5B provide exemplary logical components of MNO activation platform 150 and MNO authentication platform 160, in other implementations, MNO activation platform 150 and MNO authentication platform 160 may include fewer, additional, or different network elements. In other implementations, some logical components of MNO activation platform 150 and MNO authentication platform may be shared and/or combined.

Figure 6A:
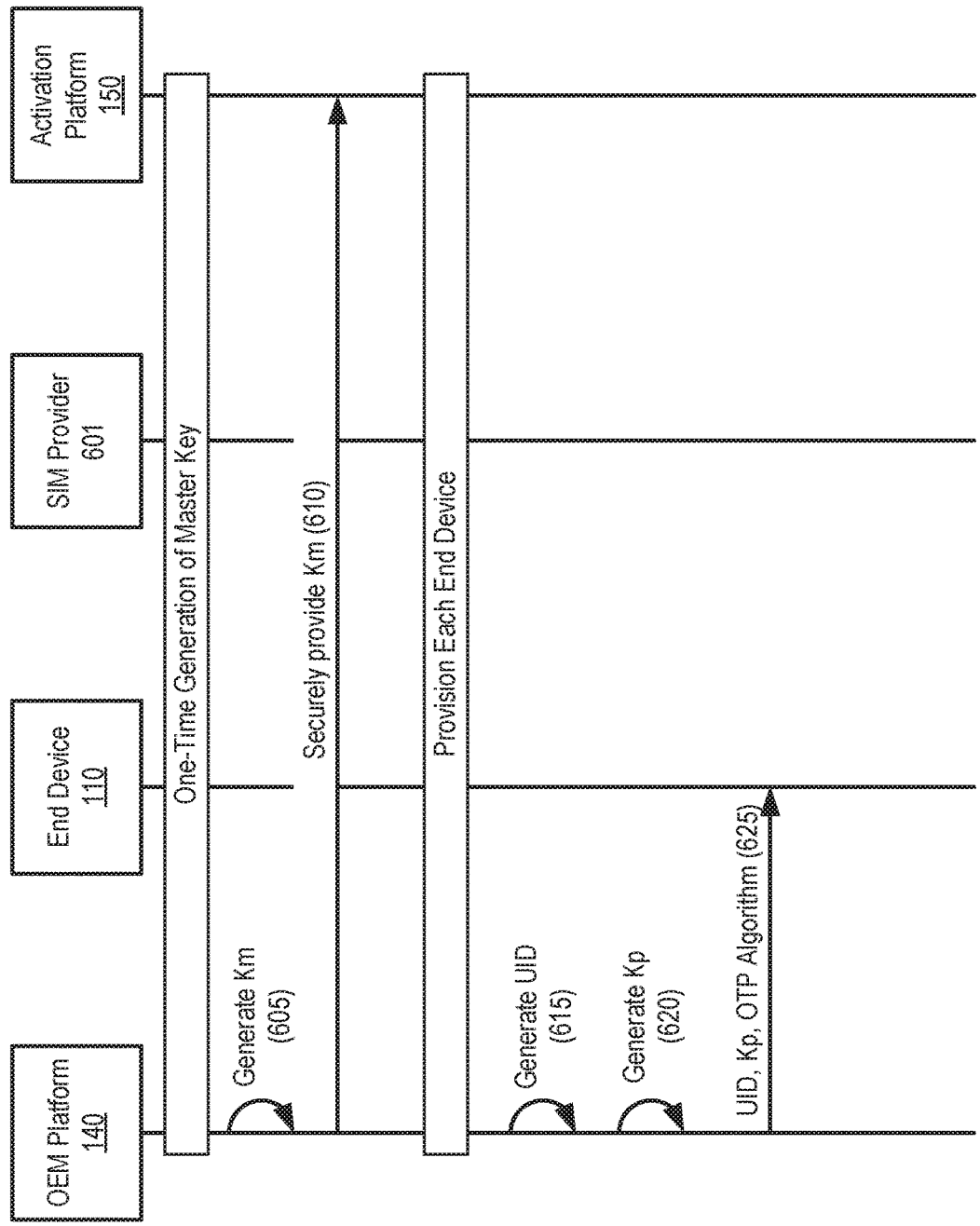
FIGS. 6A and 6B are signal flow diagrams illustrating exemplary communications to provision end devices to provide authenticated identity according to an implementation.
Figure 6B:
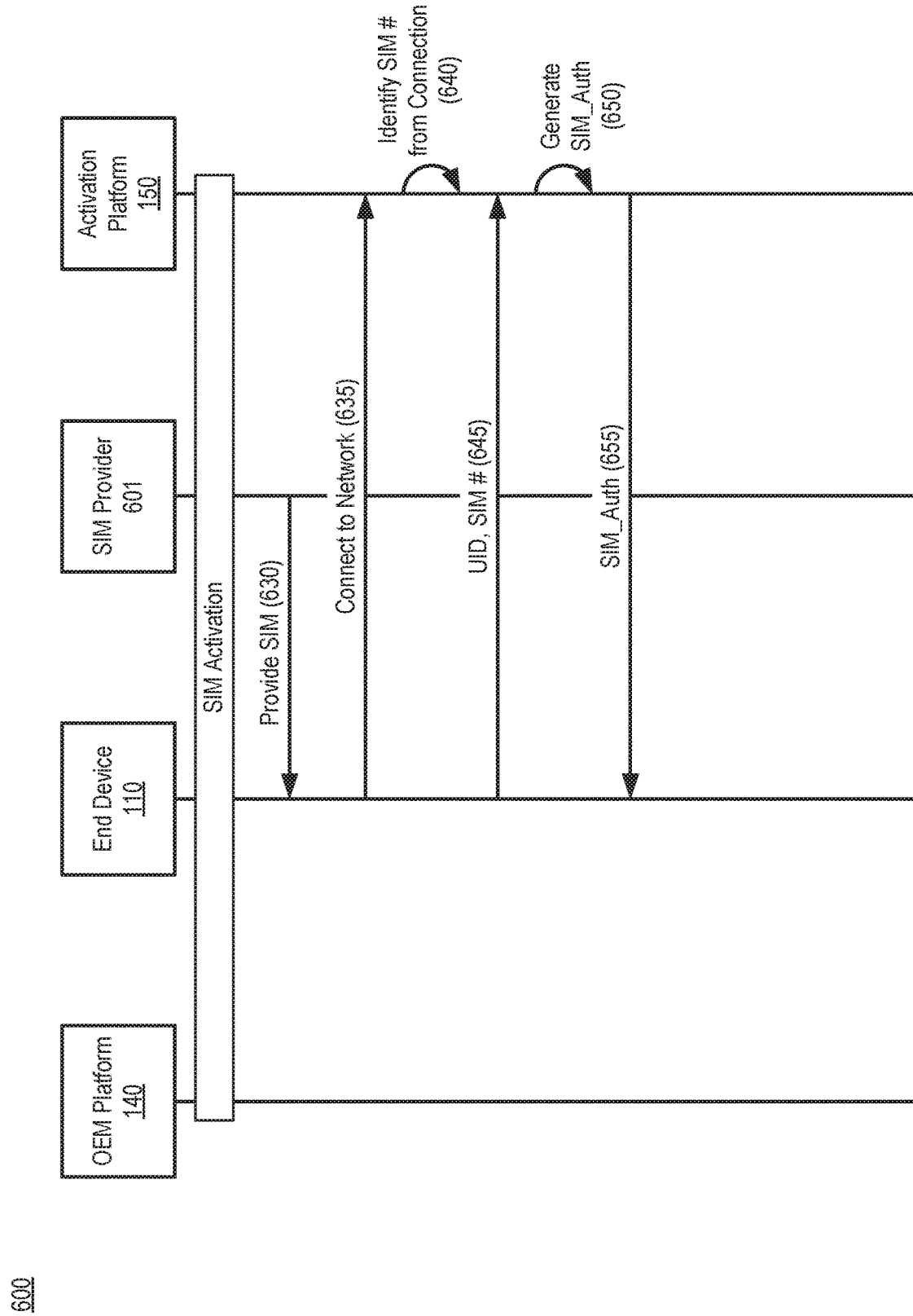

FIGS. 6A-6B are signal flow diagrams illustrating exemplary communications to provision end devices for authenticated identity in a portion 600 of network environment 100. As shown in FIGS. 6A-6B, network portion 600 may include UE device 110, OEM platform 140, MNO activation platform 150, and a SIM provider 601. SIM provider 601 may include an entity, such as a store, that provides a physical SIM card or electronic SIM for an end device 110 to be activated on a MNO's network (e.g., core network 130). Communications shown in FIG. 6A-6B provide simplified illustrations of communications in network portion 600 and are not intended to reflect every signal or communication exchanged between devices/functions.

As shown in FIG. 6A, at step 605, OEM platform 140 may generate a master key, Km, for an MNO or for a particular phone model. For example, master key generator 410 may generate a large random number for Km. As shown in step 610, Km may be securely provided to MNO activation platform 150 and stored (e.g., in master key storage 502).

OEM platform 140 may also generate a UID (step 615) and a Kp (step 620) for each end device 110. As describe above in connection with FIGS. 3 and 4, the UID maybe a random number and Kp may be generated based on a MAC that applies the UID and Km. As shown in step 625, the UID, Kp, and an OTP algorithm that applies (among other data) the UID and Kp may be loaded onto end device 110, such that each end device 110 is configured with a different UID and Kp.

Referring to FIG. 6B, at step 630, end device 110 may be provided with SIM 119 (e.g., a SIM card may be physically inserted into end device 110 at time of purchase) or activated with an eSIM (e.g., through an over-the-air provisioning processes). End device 110 may make an initial connection to core network 130 (step 635) and eventually connect to MNO activation platform 150. When end device 110 is activated with the SIM card (or eSIM), end device 110 may send the UID and SIM number to MNO activation platform 150, as shown in step 645. Alternatively, MNO activation platform 150 may obtain the SIM number for end device 110 via the network connection data (step 640), and end device 110 may send only the UID to MNO activation platform 150 in step 645.

At step 650, MNO activation platform 150 creates a device-specific SIM authentication code, SIM_Auth, based on the master key (Km), the UID, and the SIM number. The authentication code is returned to end device 110 in step 655. End device 110 may store the authentication code for use in future network connections, as described below. The authentication code does not necessarily need to be stored in a secure location on end device 110. However, if an application on end device 110 were to alter the authentication code, the next connection attempt by end device 110 to core network 130 would fail the authentication. Therefore, it would be advantageous to store the authentication code in a secure location.

Figure 7:
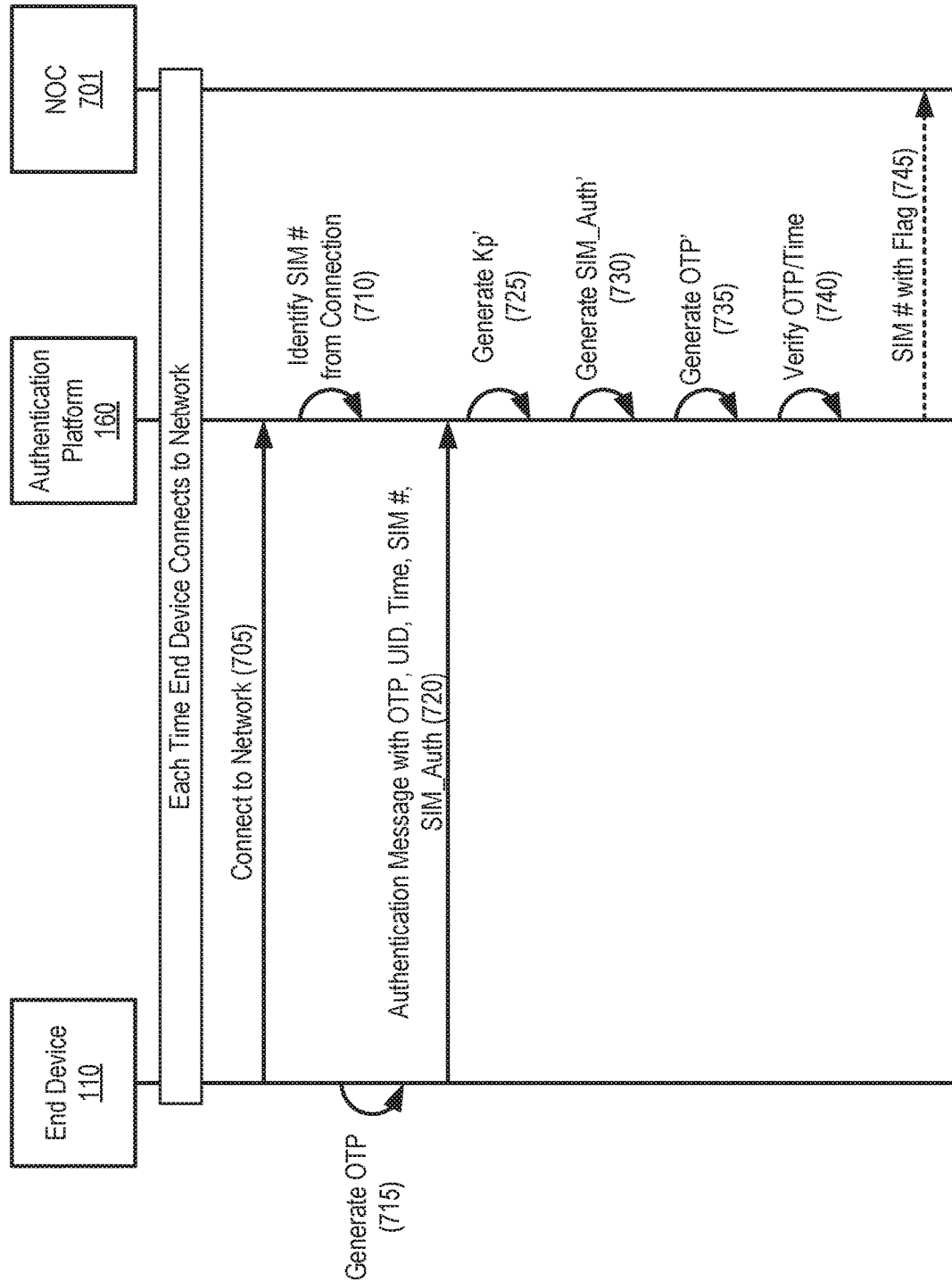
FIG. 7 is a signal flow diagram illustrating exemplary communications to authenticate SIM/end device pairs according to an implementation.

FIG. 7 is a signal flow diagram illustrating exemplary communications to authenticate a SIM card/end device pairing in a portion 700 of network environment 100. As shown in FIG. 7, network portion 700 may include UE device 110, authentication platform 160, and a network operations center (NOC) 701. Communications shown in FIG. 7 provide simplified illustrations of communications in network portion 700 and are not intended to reflect every signal or communication exchanged between devices/functions.

NOC 701 may include one or more devices (e.g., server devices) from which administrators supervise, monitor, and maintain network environment 100. For example, NOC 701 may be responsible for analyzing problems in access network 120 or core network 130 (including issues with SIM authentication), performing troubleshooting, communicating with site technicians and other network operations centers, and tracking problems through to resolution. NOC 701 may connect to core network 130 via wired and/or wireless connections.

As shown in FIG. 7, after activation, end device 110 may connect to core network 130 at step 705. According to an implementation, authentication platform 160 may obtain the SIM number for end device 110 via the network connection data (step 710).

When connecting to the wireless network (e.g., access network 120/core network 130), end device 110 (e.g., OTP generator 316) may create a one-time password for the connection at step 715. As shown at step 720 and described above in connection with FIG. 3, end device 110 may send an authentication message that includes the OTP, the UID, a time value, the SIM number, and the SIM_Auth for end device 110 to authentication platform 160. Authentication platform 160 may receive the OTP, the UID, a time value, the SIM number, and the SIM_Auth and perform a series of calculations to verify the SIM/end device pairing.

At step 725, authentication platform 160 recreates the end device private key, Kp', using Km (e.g., as previously provided to authentication platform 160 from MNO activation platform 140) and the UID (as provided in step 720). According to an implementation where a different master key is assigned for each model of end device 110, authentication platform 160 may identify the model of end device 110 from network connection data at step 710 and select an appropriate corresponding master key to use for generating the private key, Kp'. The recreated private key may be defined as:

$$Kp'=MAC[Km,UID].$$

At step 730, authentication platform 160 recreates a SIM authentication code, SIM_Auth', using Km, the UID, and the SIM number. The SIM number can be the SIM number sent from end device 110 at step 720 or the SIM number obtained from the connection data at step 710. Thus, the recreated SIM authentication code may be defined as:

$$SIM\_Auth'=MAC[Km,UID\|SIM\ \#].$$

At step 735, authentication platform 160 recreates the same one-time password, OTP', that end device 110 previously created using Kp', the UID, the time value (e.g., as provided by end device 110 in step 720), and SIM_Auth'. Thus, the recreated one-time password may be defined as:

OTP'=MAC[Kp',UID||Time||SIM_Auth'].

At step 740, authentication platform 160 verifies the one-time password, OTP, received from end device 110 against the one-time password, OTP', generated by authentication platform 160. Network device may confirm that OTP' matches OTP from end device 110, and that the time difference between the time provided by end device 110 (e.g., at step 720) and the universal time of the wireless network at the time of verification (e.g., step 740) are reasonably close (e.g., within a few seconds or fractions of seconds). If so, it can be confirmed that (1) end device 110 is in possession of the private key, Kp, (2) end device 110 must have the UID provisioned by OEM platform 140, and (3) end device 110 must have the SIM number received from MNO activation platform 140. Thus, the SIM/end device pair is valid and no further action is required.

If, at step 740, OTP' and OTP do not match, or if the network time and end device time are not reasonably close, the SIM/end device pair may not be valid. Thus, at step 745, authentication platform 160 may provide the SIM number for end device 110 (e.g., as provided in step 710 or step 720) to NOC 701 for resolution. Invalid SIM/end device pairing scenarios that would be detected are described below.

Using the above validation procedures, if the SIM card in end device 110 is replaced, then SIM_Auth will not equal SIM_Auth' because the SIM number is different than the number associated with SIM_Auth, and, therefore, the OTP and OTP' will not match. If the SIM card and the SIM_Auth are replaced, SIM_Auth still will not equal SIM_Auth' because the UID will be different, and, therefore, the OTP and OTP' will again not match.

If the SIM card, the SIM_Auth, and the UID are replaced, Kp' will not match Kp, and, therefore, the OTP and OTP' will not match. If the SIM card and any other artifacts are replaced and a previous OTP is replayed, the time will be off and the authentication will therefore be invalid.

If the SIM card is replaced and software is changed such that the software reported the previous SIM number, and if the network device used the SIM number reported by the authentication message instead of the SIM number obtained from the phone's connection to the wireless network, this could defeat the validation process. However, if the SIM number is obtained from the end device's connection to the wireless network, then validation process would detect the SIM swap.

Figure 8:
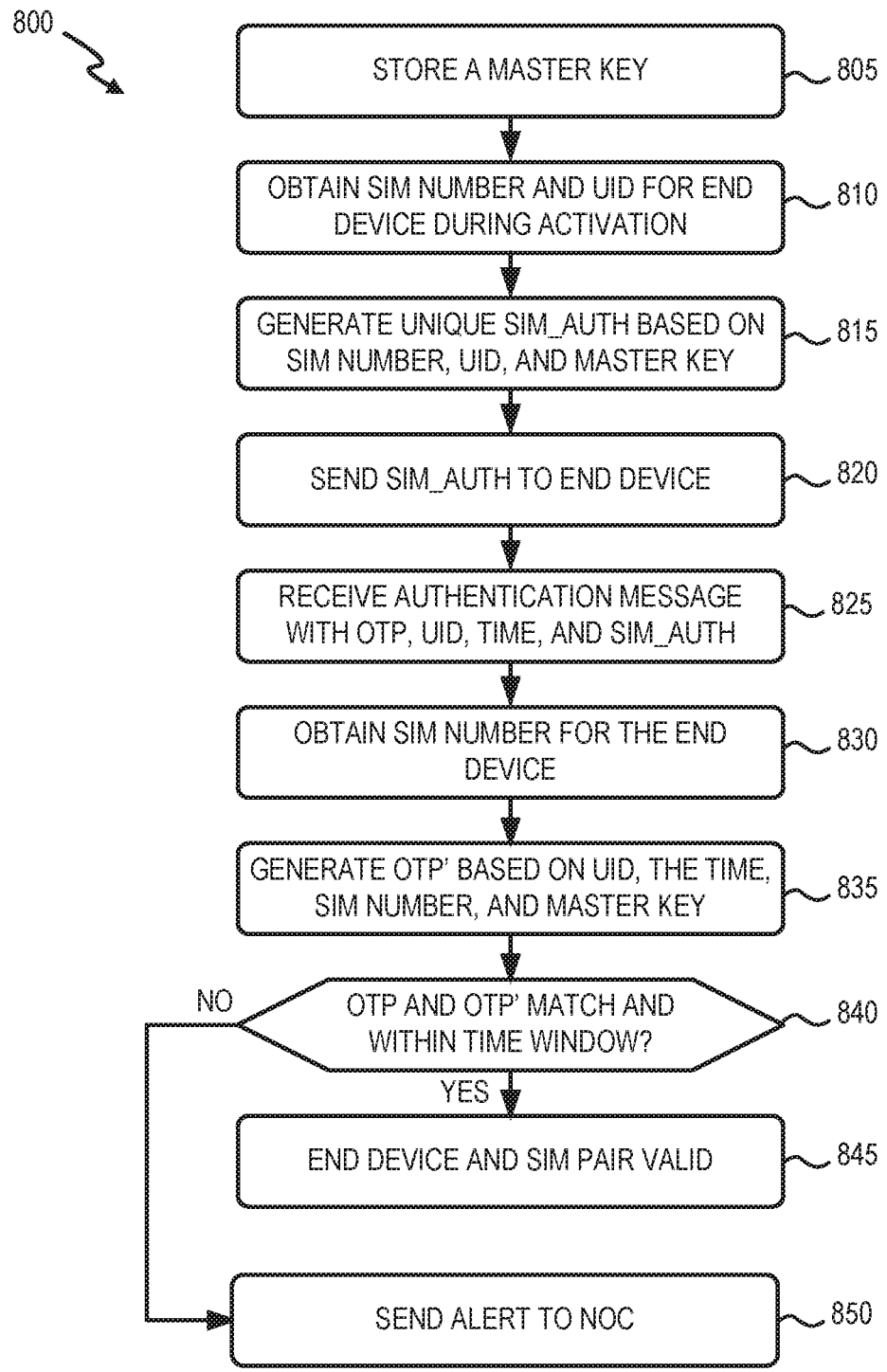
FIG. 8 is a flow diagram illustrating an exemplary process for authenticating SIM/end device pairs according to an implementation described herein.

FIG. 8 is a flow diagram illustrating an exemplary process 800 for authenticating SIM/end device pairs, according to an implementation described herein. In one implementation, process 800 may be implemented by one or more network devices 135, such as activation platform 150 and authentication platform 160. In another implementation, process 800 may be implemented by a network device 135 in conjunction with end device 110.

Process 800 may include storing a master key (block 805). For example, OEM platform 140 may create a master key, Km, which is provided to activation platform 150 and authentication platform 160. Alternatively, a network device 135 in core network 130 may generate the master key and provide the master key to OEM platform 140. The master key may be stored, for example, in an HSM.

Process 800 may further include obtaining a SIM number and UID for an end device during network activation (block 810), generating a unique SIM authentication code (SIM_Auth) based on the SIM number, UID, and master key (block 815), and sending the SIM_Auth to the end device (block 820). For example, after end device 110 is provisioned with a UID, a Kp, and an OTP algorithm during manufacture, end device 110 may be provided with a SIM as part of a network activation process for a wireless network. Using the SIM, end device 110 may connect to core network 130, providing the SIM number as part of the network activation process. End device 110 may also provide the UID and (optionally) the SIM number to MNO activation platform 150. MNO activation platform 150 may use the SIM number, UID and Km to generate the unique SIM authentication code for end device 110. MNO activation platform 150 may send the unique SIM authentication code to end device 110.

Process 800 may also include receiving an authentication message with an OTP, the UID, a time value, and the SIM_Auth (block 825), obtaining a SIM number for the end device (block 830), and generating a copy of the OTP (OTP') based on the UID, the time, the SIM number, and the master key (block 835). For example, authentication platform 160 may receive an authentication message when end device 110 connects to the wireless network. The authentication message may include an OTP derived from Kp, the UID, a time, and the SIM_Auth. The authentication message may also include the UID, time, and SIM_Auth. According to an implementation, the authentication message may also include the SIM number used by end device 110. Additionally, or alternatively, authentication platform 160 may obtain the SIM number from the end device 110 network connection data. Using information from the authentication message, the SIM number, and the stored master key, authentication platform 160 may generate OTP', as described above.

Process 800 may additionally include determining if the OTP provided by the end device matches the OTP copy (OTP') generated by the network device, and that the authentication message was received within a time window (block 840). For example, authentication platform 160 may compare OTP and OTP' to ensure they match. The network device may also use the time value from the authentication message to ensure that the OTP was received within a configurable time window after the time value.

If the OTP matches OTP' and the authentication message was received within the time window (block 840-Yes), process 800 may determine that the end device and SIM number pairing is valid (block 845). If he OTP does not match OTP' or the authentication message was received outside the time window (block 840-No), process 800 may include sending an alert message to a network operations center (block 850). For example, authentication platform 160 may send an alert message to NOC 701 with the SIM number used by the end device 110. According to an implementation, the alert message may cause NOC 701 to initiate a SIM validation inquiry, automatically disable some or all service for end device 110, and/or automatically send an alert message to an alternate contact (e.g., email, alternate phone number, social media message, etc.) associated with an end device user profile. In other exemplary aspects, the alert message may cause the SIM number to be invalidated and/or the device identification to be recorded for possible blacklisting. As another example, the alert message may cause NOC 701 to temporarily disable some wireless network services for end device 110 (e.g., inbound calls and text messages) that are typically used in SIM swaps and other fraudulent schemes that attempt to defeat two-factor authentication.

Figure 9:
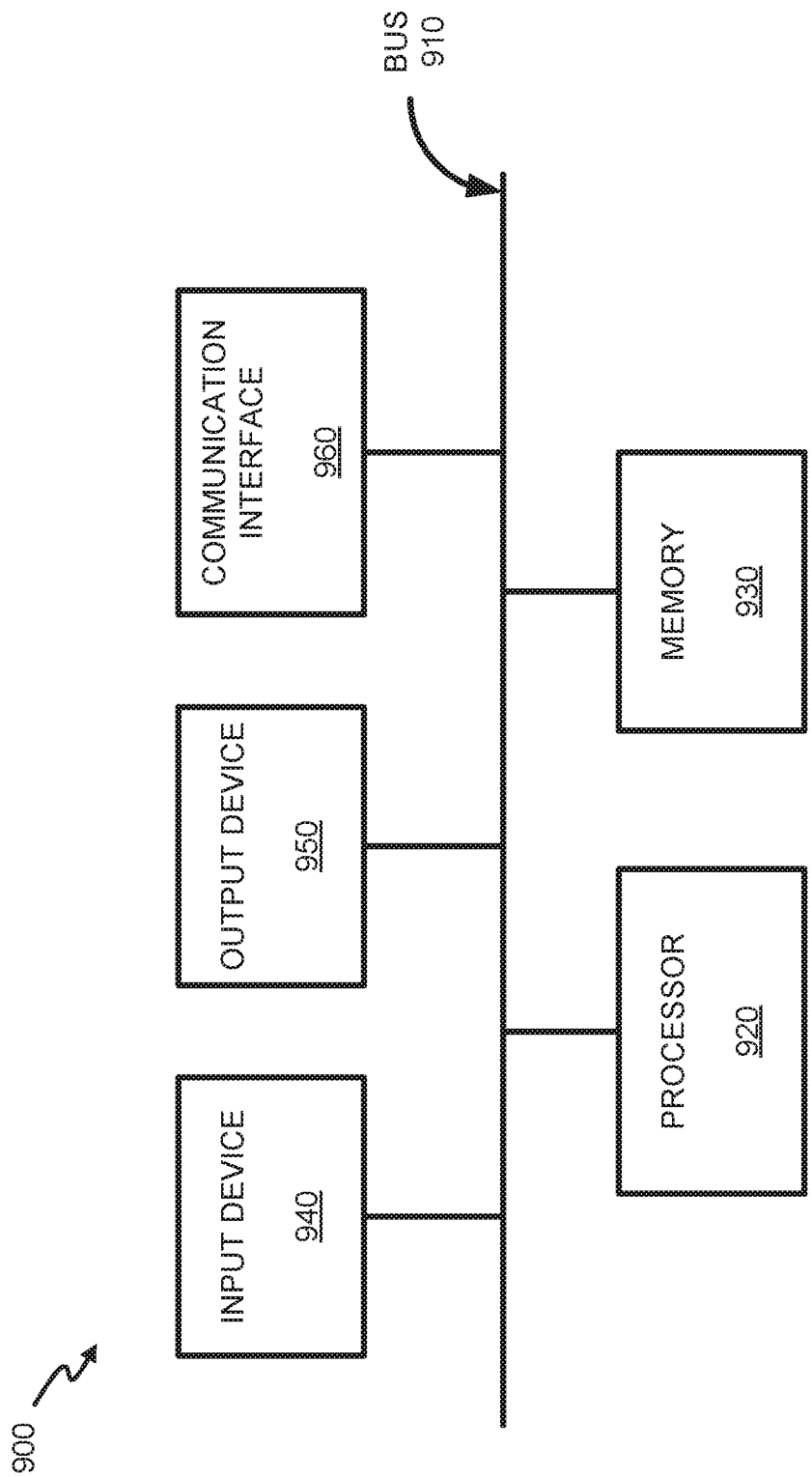
FIG. 9 is diagram illustrating exemplary logical components of a network device of FIG. 1.

FIG. 9 is a diagram illustrating example components of a device 900 according to an implementation described herein. Network devices 135, OEM platform 140, activation platform 150, authentication platform 160, and other devices in network environment 100 may each be implemented in one or more devices 900. As shown in FIG. 9, device 900 may include a bus 910, a processor 920, a memory 930, an input device 940, an output device 950, and a communication interface 960.

Bus 910 may include a path that permits communication among the components of device 900. Processor 920 may include any type of single-core processor, multi-core processor, microprocessor, latch-based processor, and/or processing logic (or families of processors, microprocessors, and/or processing logics) that interprets and executes instructions. In other embodiments, processor 920 may include an application-specific integrated circuit (ASIC), a field-programmable gate array (FPGA), and/or another type of integrated circuit or processing logic.

Memory 930 may include any type of dynamic storage device that may store information and/or instructions, for execution by processor 920, and/or any type of non-volatile storage device that may store information for use by processor 920. For example, memory 930 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 940 may allow an operator to input information into device 900. Input device 940 may include, for example, a keyboard, a mouse, a pen, a microphone, a remote control, an audio capture device, an image and/or video capture device, a touch-screen display, and/or another type of input device. In some embodiments, device 900 may be managed remotely and may not include input device 940. Output device 950 may output information to an operator of device 900. Output device 950 may include a display, a printer, a speaker, and/or another type of output device. For example, device 900 may include a display, which may include a liquid-crystal display (LCD) for displaying content to the customer. In some embodiments, device 900 may be managed remotely and may not include output device 950.

Communication interface 960 may include a transceiver that enables device 900 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 960 may include a logical component that includes input and/or output ports, input and/or output systems, and/or other input and output components that facilitate the transmission of data to other devices. For example, communication interface 960 may include a network interface card (e.g., Ethernet card) for wired communications and/or a wireless network interface (e.g., a Wi-Fi, LTE, etc.) card for wireless communications.

As described above, device 900 may perform certain operations relating to authenticating SIM/end device pairs. Device 900 may perform these operations in response to processor 920 executing software instructions contained in a computer-readable medium, such as memory 930. A computer-readable medium may be defined as a non-transitory memory device. A memory device may be implemented within a single physical memory device or spread across multiple physical memory devices. The software instructions may be read into memory 930 from another computer-readable medium or from another device. The software instructions contained in memory 930 may cause processor 920 to perform processes described herein. Alternatively, hardwired circuitry may be used in place of, or in combination with, software instructions to implement processes described herein. Thus, implementations described herein are not limited to any specific combination of hardware circuitry and software.

Although FIG. 9 shows exemplary components of device 900, in other implementations, device 900 may include fewer components, different components, additional components, or differently arranged components than depicted in FIG. 9. For example, when implemented as OEM platform 140, MNO provisioning platform 150, or MNO authentication platform 160, device 900 may include an HSM to store the master key, Km, and perform cryptographic processing related thereto. Additionally or alternatively, one or more components of device 900 may perform one or more tasks described as being performed by one or more other components of device 900.

Systems and methods described herein validate, for each network connection, that a subscriber identity module (SIM) number of an end device is the same number that was activated for that device. A network device in a MNO's network obtains a SIM number and a universal identifier (UID) for the end device during an activation procedure. The network device generates a unique SIM authentication code based on the SIM number, the UID, and a master key. The network device sends the unique SIM authentication code to the end device as part of the activation procedure. After activation, the network receives, from the end device, an authentication message that includes a first one-time password (OTP), the UID, a time value, the SIM number, and the SIM authentication code. The network generates a second OTP based on the UID, the time value, the SIM number, and the master key and validates a pairing of the end device and the SIM number when the two OTPs match.

Uniquely, network devices 135 in the wireless network can perform the validation while only storing one number, Km. Therefore, the validation procedure can scale to a large number of end devices. In addition, since the validation procedure does not require any database lookups, it runs very quickly. Furthermore, since it is computationally efficient, the validation procedure requires very little hardware to provide the processing power needed to implement it. Also, the validation procedure can be performed without storing personal information of the end device user.

Upon re-activation of an account, the validation procedure may include deleting the UID from the end device, if the old SIM should no longer be used with the end device. If both the old and new SIM are to be used in the end device, a second UID, Kp, and SIM_Auth code may be added to the end device as part of the re-activation procedure.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible Thus, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 8, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 920, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 920) of a device. A non-transitory storage medium includes one or more of the storage mediums described in relation to memory 215/930.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method comprising:
   generating, by one or more network devices, a unique authentication code for an end device based on two or more unique identifiers, and a master key;
   sending, by the one or more network devices and to the end device for activation, the unique authentication code;
   receiving, by the one or more network devices and from the end device, an authentication message that provides a first one-time password, the two or more unique identifiers, and the authentication code;
   generating, by the one or more network devices, a second one-time password based on the two or more unique identifiers and the master key; and
   validating, by the one or more network devices, a pairing of the end device and one of the two or more unique identifiers when the first one-time password matches the second one-time password.

2. The method of claim 1, further comprising:
   sending, by the one or more network devices, an alert message when:
      the first one-time password does not match the second one-time password, or
      the authentication message is received outside a time window.

3. The method of claim 1, wherein the two or more unique identifiers include a subscriber identity module (SIM) number for a physical SIM card or electronic SIM.

4. The method of claim 3, wherein the two or more unique identifiers further, include a universal identifier (UID) for the end device.

5. The method of claim 1, wherein the first one-time password is derived by the end device using one of the two or more unique identifiers, the authentication code, and a private key, the private key being assigned to the end device during a manufacturing process.

6. The method of claim 1, wherein the authentication message further provides a time value that corresponds to a time the authentication message was generated by the end device.

7. The method of claim 6, wherein validating the pairing further comprises:
   validating the pairing of the end device and the one of the two or more unique identifiers when the time value of the authentication message is within a time window.

8. The method of claim 1, further comprising:
   receiving, by the one or more network devices, the master key from an original equipment manufacturer (OEM) platform.

9. The method of claim 1, herein generating the second one-time password comprises:
generating a copy of a private key that corresponds to a private key stored on the end device, wherein the copy of the private key is generated based on a first one of the unique identifiers and the master key; and
generating a copy of the authentication code, wherein the copy of the authentication code is generated based on a second one of the unique identifiers and the master key.

10. The method of claim 1, wherein generating the unique authentication code includes applying a message authentication code (MAC) algorithm to the master key and the unique identifiers.

11. A network device in a wireless network, comprising:
a memory storing instructions; and
a processor configured to execute the instructions to:
generate a unique authentication code for an end device based on two or more unique identifiers and a master key;
send, to the end device for activation, the unique authentication code;
receive, from the end device, an authentication message that provides a first one-time password, the two or more unique identifiers, and the authentication code;
generate a second one-time password based on the two or more unique identifiers and the master key; and
validate a pairing of the end device and one of the two or more unique identifiers when the first one-time password matches the second one-time password.

12. The network device of claim 11, wherein the two or more unique identifiers include:
a subscriber identity module (SIM) number for a physical SIM card or electronic SIM, and
a universal identifier (UID) for the end device, and
wherein the processor is further configured to:
send, to a network operations center, an alert message when the pairing of the end device and the SIM number is not validated within a time window.

13. The network device of claim 11, wherein the two or more unique identifiers include:
a subscriber identity module (SIM) number for a physical SIM card or electronic SIM, and
a universal identifier (UID) for the end device.

14. The network device of claim 11, herein the first one-time password is derived by the end device using a private key assigned to the end device, one of the two or more unique identifiers, and the authentication code.

15. The network device of claim 11, wherein the network device is included in a wireless core network.

16. The network device of claim 11, wherein, when generating the second one-time password, the processor is further configured to:
generate the second one-time password using a locally-generated copy of the private key, a locally-generated copy of the authentication code, and one of the two or more unique identifiers.

17. The network device of claim 11, wherein, when generating the second one-time password, the processor is further configured to:
use a keyed-hash message authentication code (HMAC) algorithm.

18. A non-transitory computer-readable medium storing instructions executable by one or more processors, the instructions comprising instructions for:
generating a unique SIM authentication code for an end device based on two or more unique identifiers and a master key;
sending, to the end device for activation, the unique authentication code;
receiving, from the end device, an authentication message that provides a first one-time password, the two or more unique identifiers, and the authentication code;
generating a second one-time password based on the two or more unique identifiers and the master key; and
validating a pairing of the end device and one of the two or more unique identifiers when the first one-time password matches the second one-time password.

19. The non-transitory computer-readable medium of claim 18, the instructions for generating the second one-time password further comprising instructions for:
generating the second one-time password using a locally-generated copy of the private key, a locally-generated copy of the authentication code, and one of the two or more unique identifiers.

20. The non-transitory computer-readable medium of claim 18, wherein the two or more unique identifiers include:
a subscriber identity module (SIM) number for a physical SIM card or electronic SIM, and
a universal identifier (UID) for the end device.

* * * * *